United States Patent
Yamauchi (10) Patent No.: US 7,705,914 B2
(45) Date of Patent: Apr. 27, 2010

(54) PULL-DOWN SIGNAL DETECTION APPARATUS, PULL-DOWN SIGNAL DETECTION METHOD AND PROGRESSIVE-SCAN CONVERSION APPARATUS

(75) Inventor: Himio Yamauchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1001 days.

(21) Appl. No.: 11/443,026

(22) Filed: May 31, 2006

(65) Prior Publication Data
US 2007/0279532 A1 Dec. 6, 2007

(30) Foreign Application Priority Data
May 31, 2005 (JP) ............................. 2005-160694

(51) Int. Cl.
H04N 3/36 (2006.01)
H04N 9/11 (2006.01)
H04N 9/64 (2006.01)
H04N 7/01 (2006.01)
H04N 11/20 (2006.01)
H04N 5/46 (2006.01)

(52) U.S. Cl. .................... 348/448; 348/97; 348/558; 348/701; 348/452

(58) Field of Classification Search .............. 348/97, 348/448, 452, 558, 701
See application file for complete search history.

(56) References Cited

U.S. PATENT DOCUMENTS

| | | | | |
|---|---|---|---|---|
| 5,534,935 A * | 7/1996 | Kawai et al. | ................. | 348/448 |
| 5,844,618 A | 12/1998 | Horiike et al. | | |
| 6,108,041 A * | 8/2000 | Faroudja et al. | ............. | 348/446 |
| 6,380,978 B1 * | 4/2002 | Adams et al. | ............... | 348/452 |
| 6,414,719 B1 * | 7/2002 | Parikh | .......................... | 348/448 |
| 6,459,455 B1 * | 10/2002 | Jiang et al. | .................. | 348/452 |
| 6,525,774 B1 * | 2/2003 | Sugihara | ..................... | 348/459 |
| 6,839,094 B2 * | 1/2005 | Tang et al. | .................. | 348/607 |
| 7,139,029 B2 * | 11/2006 | Holland et al. | .............. | 348/441 |
| 7,154,555 B2 * | 12/2006 | Conklin | ...................... | 348/448 |
| 7,349,029 B1 * | 3/2008 | Chou | .......................... | 348/448 |
| 7,446,818 B2 * | 11/2008 | Chao | ........................... | 348/558 |
| 7,450,184 B1 * | 11/2008 | Pillay et al. | ................. | 348/700 |
| 7,538,824 B1 * | 5/2009 | Pillay et al. | ................. | 348/701 |
| 7,612,828 B2 * | 11/2009 | Winger et al. | ............... | 348/449 |
| 7,616,693 B2 * | 11/2009 | Chou et al. | ............ | 375/240.26 |
| 2001/0002853 A1 | 6/2001 | Lim | | |

(Continued)

FOREIGN PATENT DOCUMENTS

JP 2002-290927 10/2002

(Continued)

*Primary Examiner*—Brian P Yenke
(74) *Attorney, Agent, or Firm*—Finnegan, Henderson, Farabow, Garrett & Dunner, L.L.P.

(57) ABSTRACT

A pull-down signal detection circuit includes an inter-field correlation determination unit configured to determine an inter-field correlation on the basis of a current field signal and a 1-field delay signal, and providing a determination result which indicates a "strong/middle/weak" level, an inter-frame correlation determination unit configured to determine an inter-frame correlation on the basis of the current field signal and a 2-field delay signal, and a pull-down signal determination unit configured to determine whether the input video signal is a pull-down signal or not, on the basis of the determination results of the inter-field correlation determination unit and the inter-frame correlation determination unit.

18 Claims, 9 Drawing Sheets

U.S. PATENT DOCUMENTS

| | | | |
|---|---|---|---|
| 2002/0130970 A1* | 9/2002 | Jiang | 348/459 |
| 2002/0149703 A1* | 10/2002 | Adams et al. | 348/700 |
| 2004/0008275 A1 | 1/2004 | Yang et al. | |
| 2004/0061803 A1 | 4/2004 | Terai et al. | |
| 2005/0001929 A1 | 1/2005 | Ochial et al. | |
| 2005/0024534 A1 | 2/2005 | Honda et al. | |
| 2007/0052846 A1* | 3/2007 | Adams | 348/452 |
| 2007/0097259 A1* | 5/2007 | MacInnis et al. | 348/441 |
| 2007/0188662 A1* | 8/2007 | Winger et al. | 348/701 |
| 2007/0258014 A1* | 11/2007 | Doswald | 348/701 |
| 2008/0151103 A1* | 6/2008 | Asamura et al. | 348/448 |
| 2009/0161021 A1* | 6/2009 | Swartz | 348/700 |

FOREIGN PATENT DOCUMENTS

| | | |
|---|---|---|
| JP | 2002-369156 | 12/2002 |
| JP | 2003-116109 | 4/2003 |
| JP | 2004-242196 | 8/2004 |

* cited by examiner

Scene with few vertical high-frequency components

| | | | | | | | | | | | | | |
|---|---|---|---|---|---|---|---|---|---|---|---|---|---|
| (a) Current field signal S1 | Ae | Ao | Be | Bo | Co | Ce | Do | De | Eo | Ee | Fo | Fe | Go | Ge |
| (b) 1-field delay signal S2 | | Ae | Ao | Be | Bo | Co | Ce | Do | De | Eo | Ee | Fo | Fe | Go | Ge |
| (c) 2-field delay signal S3 | | | Ae | Ao | Be | Bo | Co | Ce | Do | De | Eo | Ee | Fo | Fe | Go | Ge |
| (d) Correct correlation between frames (S1 and S3) | Weak | Weak | Weak | Strong | Weak | Weak | Weak | Strong | Weak | Weak | Weak | Strong | Weak | Weak |
| (e) Correct correlation between fields (S1 and S2) | Weak | Strong | Weak | Strong | Weak | Strong | Weak | Strong | Weak | Strong | Weak | Strong | Weak | Strong |
| (f) Correlation 3 between fields (S1 and S2) in prior art | Strong | Strong | Strong | Strong | Strong | Strong | Strong | Strong | Strong | Strong | Strong | Strong | Strong | Strong |
| (g) Correlation 4 between fields (S1 and S2) in prior art | Weak | Strong | Weak | Strong | Weak | Strong | Weak | Strong | Weak | Strong | Weak | Strong | Weak | Strong |
| (h) Correlation between fields (S1 and S2) in present invention | Weak | Strong | Strong | Middle | Strong | Middle | Strong | Weak | Strong | Weak | Strong | Middle | Strong | Weak | Strong |

PULL-DOWN SIGNAL DETECTION APPARATUS, PULL-DOWN SIGNAL DETECTION METHOD AND PROGRESSIVE-SCAN CONVERSION APPARATUS

CROSS-REFERENCE TO RELATED APPLICATIONS

This application is based upon and claims the benefit of priority from Japanese Patent Application No. 2005-160694, filed May 31, 2005, the entire contents of which are incorporated herein by reference.

BACKGROUND

1. Field of the Invention

The present invention relates generally to an apparatus which converts an interlaced-scan video signal to a progressive-scan video signal, and more particularly to an apparatus which detects an interlaced-scan video signal such as a moving picture signal that is generated by 2-3 pull-down or 2-2 pull-down.

2. Description of the Related Art

In the case of an NTSC video signal that is generally used as a TV broadcast signal, a video image is scanned by an interlaced-scan system. In this system, the equivalent number of images per second is increased, and thereby surface flicker is reduced. On the other hand, in recent years, thin TV receivers, such as liquid crystal display (LCD) devices or plasma display devices, have steadily been gaining popularity. If interlaced-scan video signals are directly displayed on the scan lines on such thin TV receivers, the brightness of the screen would considerably lower and displayed images would not be worth viewing. To avoid this problem, in these display devices, images are displayed by a progressive-scan system. When an interlaced-scan video signal is to be displayed on a progressive-scan display device such as an LCD device, an interlaced-scan/progressive-scan conversion circuit is required.

In some cases, standard TV video signals, such as NTSC signals, include video signals which are produced on the basis of cinema films. The cinema film has 24 frames per second, while the standard TV video signal is an interfaced-scan video signal with 30 frames per second (60 fields per second). Thus, the video signal of the cinema film is converted to the standard TV video signal by a 2-3 pull-down method or a 2-2 pull-down method. In the description below, an interlaced-scan video signal, which is obtained by the conversion from the video signal of the cinema film, is referred to as "pull-down signal".

For example, in the 2-3 pull-down method, a cinema film is first scanned to produce a progressive-scan video signal with a frame frequency of 24 Hz. Then, the progressive-scan video signal is converted such that the first frame of the cinema film may correspond to first and second fields (2 fields), the second frame to third to fifth fields (3 fields), the third frame to sixth and seventh fields (2 fields), and the fourth frame to eighth to tenth fields (3 fields). In the field signal which is converted to the pull-down signal, odd fields and even fields are alternately repeated. When the frame of the cinema film is converted to 3 fields, the last field (fifth field, tenth field) is the repetition of the same video content as the first field (third field, eighth field).

In this manner, two frames of the cinema film are made to correspond to five fields of the standard TV video signal, and the 2-field video signals and 3-field video signals are alternately repeated in accordance with the frames of the cinema film. Jpn. Pat. Appln. KOKAI Publication No. 2002-290927 discloses this kind of pull-down signal generating method.

In the prior art, pull-down signals could not satisfactorily be detected in both cases of a scene with many vertical high-frequency components and a scene with few vertical high-frequency components in respective images. In particular, when a 2-2 pull-down signal is to be detected, the 2-2 pull-down signal cannot be detected by an inter-frame correlation alone, and an inter-field correlation has to be used. Consequently, the detection is greatly affected by vertical high-frequency components.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided a pull-down signal detection apparatus comprising: a first difference circuit which provides a first difference between a current field signal of an input video signal and a 1-field delay signal of the current field signal; a first inter-field comparison unit configured to compare the first difference from the first difference circuit with a first comparison value, add comparison results on a field-by-field basis, compare an addition value of the added comparison results with a second comparison value on a field-by-field basis, and provide a first inter-field comparison result; a second inter-field comparison unit configured to compare the first difference from the first difference circuit with a third comparison value that is less than the first comparison value, add comparison results on a field-by-field basis, compare an addition value of the added comparison results with a fourth comparison value on a field-by-field basis, and provide a second inter-field comparison result; an inter-field correlation determination circuit which determines an inter-field correlation on the basis of the first inter-field comparison result and the second inter-field comparison result, and provides a determination result which indicates one of "strong", "middle" and "weak" levels; a second difference circuit which provides a second difference between the current field signal of the input video signal and a 2-field delay signal of the current field signal; an inter-frame correlation determination circuit which determines an inter-frame correlation on the basis of the second difference from the second difference circuit, and provides a determination result; and a pull-down signal determination circuit which determines whether the input video signal is a pull-down signal or not, on the basis of the determination results of the inter-field correlation determination circuit and the inter-frame correlation determination circuit.

According to the embodiment of the present invention, it is possible to satisfactorily detect a pull-down signal in both cases of a scene with many vertical high-frequency components and a scene with few vertical high-frequency components in video signals.

Embodiments of the present invention will now be described in detail with reference to the accompanying drawings.

Figure 1:
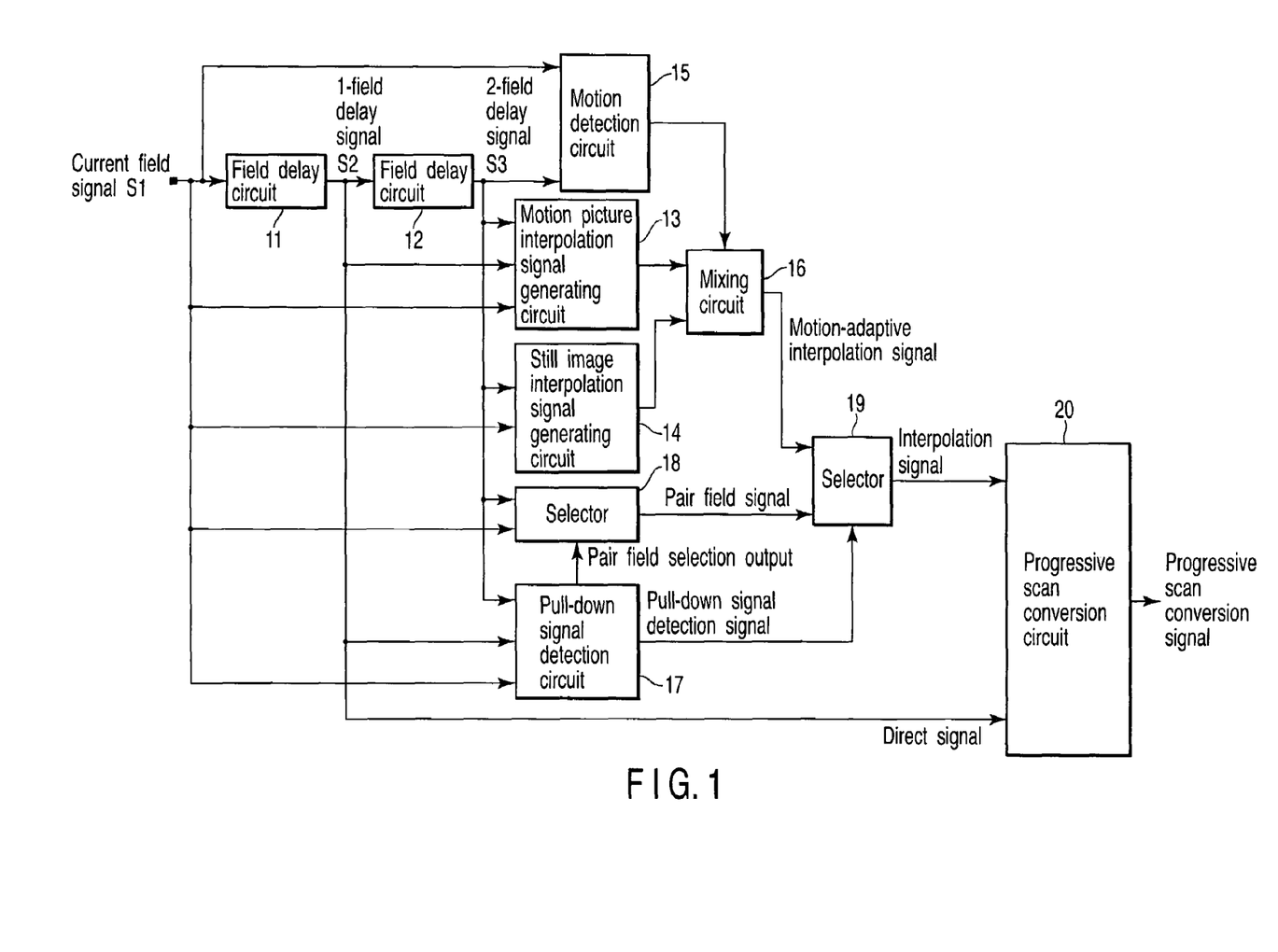
FIG. 1 shows a first embodiment of a progressive-scan conversion apparatus according to the present invention.

FIG. 1 shows a first embodiment of a progressive-scan conversion apparatus according to the present invention. A current field signal S1, which is an interlaced-scan input video signal, is input to a first field delay circuit 11 and is output as a 1-field delay signal S2 with a delay of 1 field. The field delay circuit 11 includes, for example, two 1-field memory areas. Input 1-field video signals are alternately recorded in the two memory areas. Similarly, the recorded video signals are alternately read out of the two memory areas. Thus, while the recorded current field signal is being read out of the first field delay circuit 11 as the 1-field delay signal S2, the next current field signal is recorded in the first field delay circuit 11 as the field signal S1. The 1-field delay signal S2 is input to a second field delay circuit 12 and is output as a 2-field delay signal S3 with a delay of 1 field. The structure and operation of the second field delay circuit 12 are the same as those of the first field delay circuit 11.

Figure 2:
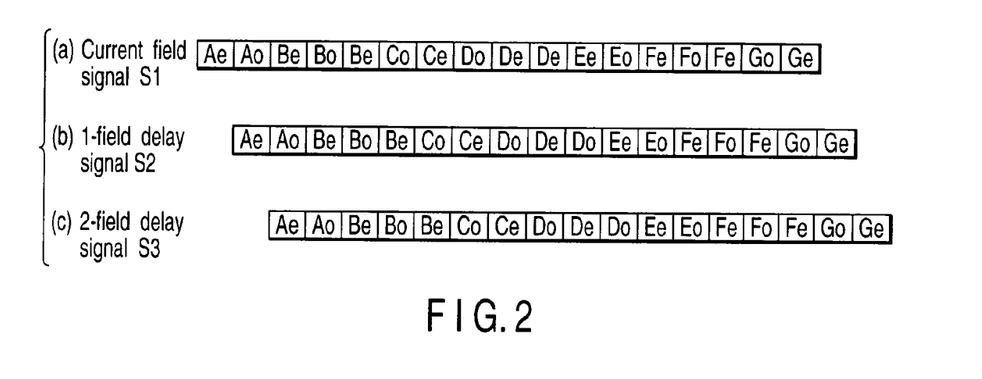
FIG. 2 illustrates an exemplary scheme in which an interlaced-scan 2-3 pull-down signal is processed.

FIG. 2 illustrates an exemplary scheme in which an interlaced-scan 2-3 pull-down signal is processed. Part (a) of FIG. 2 shows an input 2-3 pull-down signal S1. In the signal S1, Ae is an even field that is generated from a frame A of a cinema film, and Ao is an odd field that is generated from the frame A of the cinema film. Similarly, Be is an even field that is generated from a frame B of the cinema film, and Bo is an odd field that is generated from the frame B of the cinema film. The same applies to Ce, Co, . . . . Part (b) of FIG. 2 shows a 1-field delay signal S2 that is obtained by delaying the signal S1 of part (a) of FIG. 2 by 1 field. Part (c) of FIG. 2 shows a 2-field delay signal S3 that is obtained by further delaying the signal S2 of part (b) of FIG. 2 by 1 field.

Figure 3:
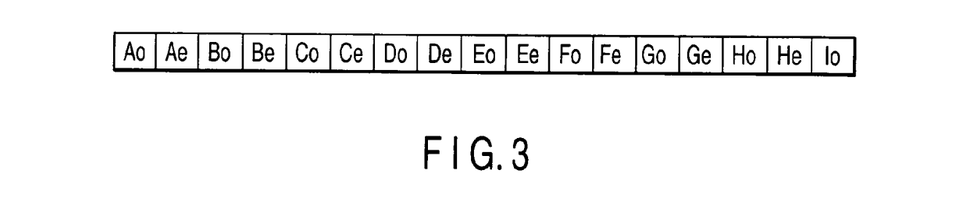
FIG. 3 shows an interlaced-scan 2-2 pull-down signal as another example of the pull-down signal.

FIG. 3 shows an interlaced-scan 2-2 pull-down signal as another example of the pull-down signal. The 2-2 pull-down signal is a video signal comprising odd fields and even fields which are generated from associated frames of a cinema film. Like the 2-3 pull-down signal, the 2-2 pull-down signal is delayed by each of the field delay circuits by 1 field.

Referring back to FIG. 1, a motion picture interpolation signal generating circuit 13 generates, from the current field signal S1, 1-field delay signal S2 and 2-field delay signal S3, a motion picture interpolation signal which is positioned between lines of the 1-field delay signal S2, for example, by motion compensation interpolation using motion vectors. A still image interpolation signal generating circuit 14 generates, from the current field signal S1 and 2-field delay signal S3, a still image interpolation signal which is positioned between lines of the 1-field delay signal S2, for example, by averaging the current field signal S1 and 2-field delay signal S3, or by using the value of the 2-field delay signal S3 itself.

A motion detection circuit 15 detects inter-frame motion on the basis of the current field signal S1 and 2-field delay signal S3, and outputs a motion detection signal to a mixing circuit 16. The mixing circuit 16 varies a mixing ratio in accordance with the motion detection signal, and mixes the motion picture interpolation signal and the still image interpolation signal, thereby generating a motion-adaptive interpolation signal.

A pull-down signal detection circuit 17 detects whether the 1-field delay signal S2 is a pull-down signal or not, on the basis of the current field signal S1, 1-field delay signal S2 and 2-field delay signal S3, and generates a pull-down signal detection signal and a pair field selection signal.

A first selector 18 selects one of the current field signal S1 and 2-field delay signal S3 as a field that is paired with the 1-field delay signal S2, and outputs the selected signal as a pair field signal to a second selector 19. If the pull-down signal detection signal is indicative of a pull-down signal, the second selector 19 selects the pair field signal. Otherwise, the second selector 19 selects the motion-adaptive interpolation signal. The second selector 19 outputs the selected signal as an interpolation signal. A progressive-scan conversion circuit 20 orderly arranges (mixes) the interpolation signal and the 1-field delay signal S2, which is a direct signal, and generates a progressive-scan conversion signal.

Figure 4:
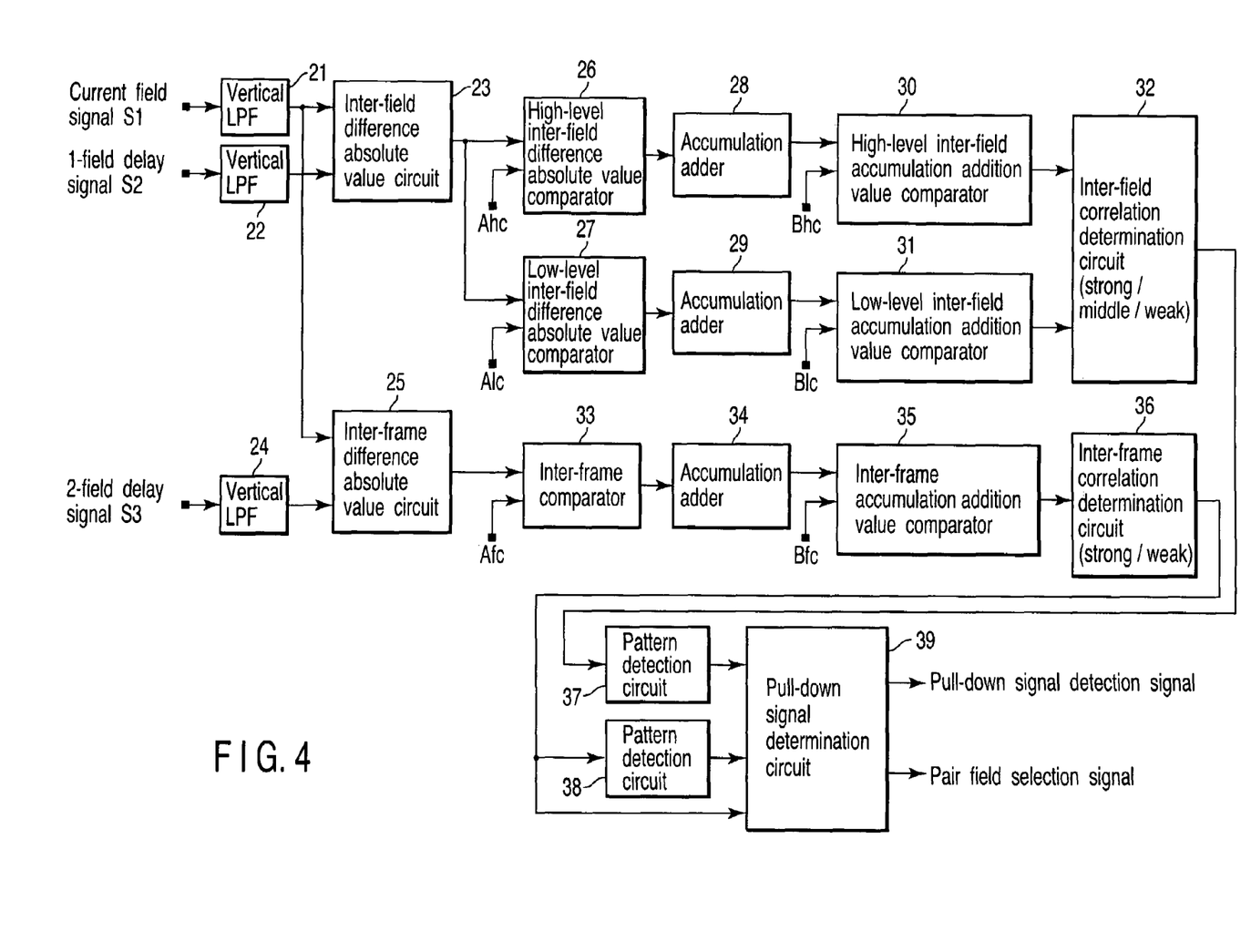
FIG. 4 shows a first embodiment of a pull-down signal detection circuit 17 according to the invention.

FIG. 4 shows a first embodiment of the pull-down signal detection circuit 17 according to the present invention. The current field signal S1 is passed through a first vertical LPF 21 and then input to an inter-field difference absolute value circuit 23 and an inter-frame difference absolute value circuit 25. The 1-field delay signal S2 is passed through a second vertical LPF 22 and then input to the inter-field difference absolute value circuit 23. The 2-field delay signal S3 is passed through a third vertical LPF 24 and then input to an inter-frame difference absolute value circuit 25.

The inter-field difference absolute value circuit 23 calculates a difference absolute value between the two input signals in units of a small area (or in units of a pixel). The calculated difference absolute value is used to find an inter-field correlation between the current field signal S1 and 1-field delay signal S2. For example, the small area is set as a rectangular area of 16 horizontal pixels×8 vertical lines. On the other hand, the inter-frame difference absolute value circuit 25 calculates a difference absolute value between the current field signal S1 and 2-field delay signal S3 in units of a pixel or in units of a small area. This difference absolute value is used to find an inter-frame correlation between these two input signals. An output from the inter-field difference absolute value circuit 23 is input to a high-level inter-field difference absolute value comparator 26 and a low-level inter-field difference absolute value comparator 27. In the high-level inter-field difference absolute value comparator 26, the inter-field difference absolute value is compared with a high-level inter-field difference absolute value comparison level Ahc in units of a small area (or in units of a pixel). In the low-level inter-field difference absolute value comparator 27, the inter-field difference absolute value is compared with a low-level inter-field difference absolute value comparison level Alc in units of a small area (or in units of a pixel). In this case, the high-level inter-field difference absolute value comparison level Ahc is set to be greater than the low-level inter-field difference absolute value comparison level Alc.

The two comparison results are accumulated and added by accumulation adders 28 and 29 within each field period, and are input to a high-level inter-field accumulation addition value comparator 30 and a low-level inter-field accumulation addition value comparator 31, respectively. The high-level inter-field accumulation addition value comparator 30 compares the output signal from the accumulation adder 28 with a high-level inter-field accumulation addition value comparison level Bhc on a field-by-field basis, and outputs a comparison result to an inter-field correlation determination circuit 32. It is assumed that the high-level inter-field accumulation addition value comparator 30 outputs an H level signal when the input signal value is greater than the comparison level Bhc and outputs an L level signal when the input signal value is less than the comparison level Bhc.

The low-level inter-field accumulation addition value comparator 31 compares the output signal from the accumulation adder 29 with a low-level inter-field accumulation addition value comparison level Blc on a field-by-field basis, and outputs a comparison result to the inter-field correlation determination circuit 32. It is assumed that the low-level inter-field accumulation addition value comparator 31 outputs an H level signal when the input signal value is greater than the comparison level Blc and outputs an L level signal when the input signal value is less than the comparison level Blc.

On the basis of the comparison result output signals from the comparators 30 and 31, the inter-field correlation determination circuit 32 determines the level of inter-field correlation, and outputs a signal indicative of a "strong/middle/weak" correlation level. In the prior art, there is provided only a single system that comprises a comparator which compares the output of the inter-field difference absolute value circuit 23 with a predetermined comparison level, and a comparator which compares an accumulation addition value of the comparison result with an accumulation addition value comparison level. Thus, in the prior art, the level of inter-field correlation is simply determined between a "strong" level and a "weak" level. Since the output signal from the inter-field difference absolute value circuit 23 represents a vertical high-frequency component of an image as a difference absolute value, this output signal has a relatively high value even with respect to a still-image scene with many vertical high-frequency components. Thus, if the comparison level for comparison with the output signal from the inter-field difference absolute value circuit 23 is so set as to correspond to a scene with few vertical high-frequency components of an image, the inter-field correlation determination result is always determined to be "weak" with respect to a scene with many vertical high-frequency components. Conversely, if the comparison level for comparison with the output signal from the inter-field difference absolute value circuit 23 is so set as to correspond to a scene with many vertical high-frequency components of an image, the inter-field correlation determination result is always determined to be "strong" with respect to a scene with few vertical high-frequency components and with little motion. As a result, in the prior art, there has been such a problem that the pull-down signal cannot satisfactorily be detected on the basis of whether there are many/few vertical high-frequency components. In the present invention, the "strong/middle/weak" level of inter-field correlation is determined on the basis of comparison results obtained from the comparators 30 and 31, and thereby this problem is solved. The differences between the prior art and the present invention will be explained below in brief.

Figure 5:
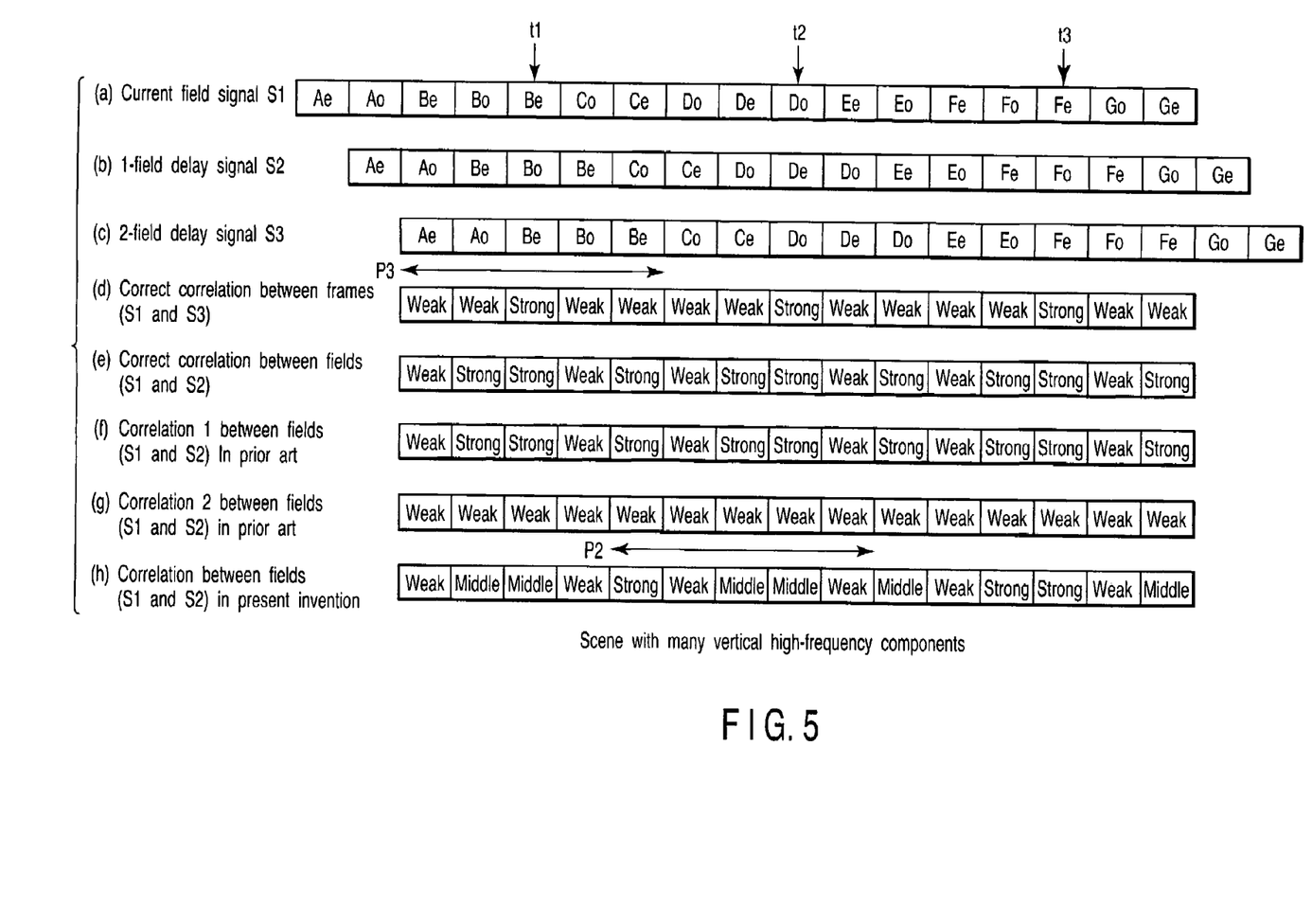
FIG. 5 shows an example of an inter-field correlation in a scene with many vertical high-frequency components of a video signal.
Figure 6:
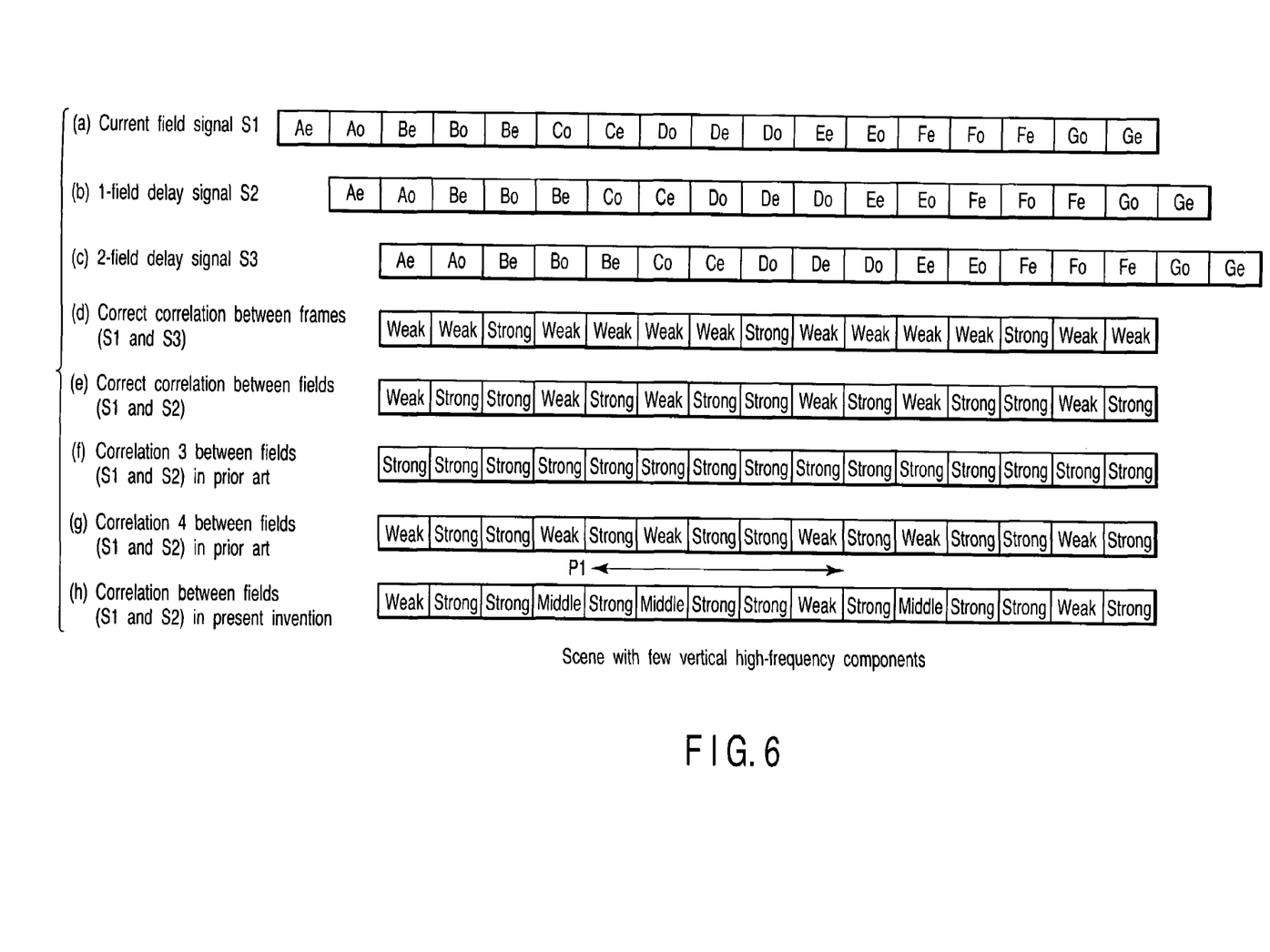
FIG. 6 shows an example of an inter-field correlation in a scene with few vertical high-frequency components of a video signal.

FIG. 5 and FIG. 6 show examples of determination results of inter-field correlation.

FIG. 5 shows an example of an inter-field correlation with respect to a scene with many high-frequency components of a video signal. Part (a) of FIG. 5 shows a current field signal S1, part (b) of FIG. 5 shows a 1-field delay signal S2, and part (c) of FIG. 5 shows a 2-field delay signal S3. Part (d) of FIG. 5 shows a correct correlation between frames (S1 and S3), and part (e) of FIG. 5 shows a correct correlation between fields (S1 and S2). Part (f) of FIG. 5 shows correlation 1 between fields (S1 and S2) in the prior art in a case where the comparison level is made to correspond to a scene with many vertical high-frequency components, part (g) of FIG. 5 shows correlation 2 between fields (S1 and S2) in the prior art in a case where the comparison level is made to correspond to a scene with few vertical high-frequency components, and part (h) of FIG. 5 shows a correlation between fields (S1 and S2) in the present invention.

In the case where the comparison level for comparison with the output signal from the inter-field difference absolute value circuit is made to correspond to a scene with many vertical high-frequency components, as in the prior art shown in part (f) of FIG. 5, the inter-field correlation result in this case agrees with the correct inter-field correlation. However, in the case where the comparison level is made to correspond to a scene with few vertical high-frequency components, as in the prior art shown in part (g) of FIG. 5, the inter-field correlation result always indicates "weak" level and the pull-down sequence cannot be detected. On the other hand, in the inter-field correlation result of the present invention, as shown in part (h) of FIG. 5, the correct inter-field correlation can be detected by recognizing "strong" or "middle" level as "strong" level, as will be described later.

FIG. 6 shows an example of inter-field correlation with respect to a scene with few high-frequency components of a video signal. Part (a) to part (e) of FIG. 6 are the same as part (a) to part (e) of FIG. 5. Part (f) of FIG. 6 shows correlation 3 between fields (S1 and S2) in the prior art in a case where the comparison level is made to correspond to a scene with many vertical high-frequency components, part (g) of FIG. 6 shows correlation 4 between fields (S1 and S2) in the prior art in a case where the comparison level is made to correspond to a scene with few vertical high-frequency components, and part (h) of FIG. 6 shows a correlation between fields (S1 and S2) in the present invention.

In the case where the comparison level for comparison with the output signal from the inter-field difference absolute value circuit is made to correspond to a scene with few vertical high-frequency components, as in the prior art shown in part (g) of FIG. 6, the inter-field correlation result in this case agrees with the correct inter-field correlation. However, in the case where the comparison level is made to correspond to a scene with many vertical high-frequency components, as in the prior art shown in part (f) of FIG. 6, the inter-field correlation result always indicates "strong" level and the pull-down sequence cannot be detected. On the other hand, in the inter-field correlation result of the present invention, as shown in part (h) of FIG. 6, the correct inter-field correlation can be detected by recognizing "middle" or "weak" level as "weak" level, as will be described later.

Referring back to FIG. 4, an output signal from the inter-frame difference absolute value circuit 25 is input to an inter-frame comparator 33 and is compared with an inter-frame comparison level Afc in units of a small area (or in units of a pixel). The comparison result is accumulated and added by an accumulation adder 34 during one field period, and the accumulation addition result is input to an inter-frame accumulation addition value comparator 35. The inter-frame accumulation addition value comparator 35 compares the input accumulation addition result with an inter-frame accumulation addition value comparison level Bfc on a filed-by-field basis. The comparison result is output to an inter-frame correlation determination circuit 36. Based on the comparison result, the inter-frame correlation determination circuit 36 determines "strong/weak" level of inter-frame correlation.

Subsequently, an inter-field pull-down pattern detection circuit 37 detects whether an inter-field correlation result of a plurality of fields, for instance, five successive fields, agrees with a peculiar pattern of a pull-down signal such as a 2-3 pull-down signal or 2-2 pull-down signal. An inter-frame pull-down pattern detection circuit 38 detects whether an inter-frame correlation result of a plurality of fields, for instance, five successive fields, agrees with a peculiar pattern of a pull-down signal such as a 2-3 pull-down signal or 2-2 pull-down signal. A pull-down signal determination circuit 39 determines whether the field signal that is input to the apparatus is a pull-down signal, such as a 2-3 pull-down signal or a 2-2 pull-down signal, on the basis of whether the inter-field pull-down pattern detection result and the inter-frame pull-down pattern detection result meet a pull-down signal condition in a period of a predetermined number of fields.

The determination result as to whether the input field signal is a pull-down signal or not is output as a pull-down signal detection signal. If the field signal input to the apparatus is the pull-down signal, the pull-down signal determination circuit 39 outputs a pair field selection signal which indicates whether a field that is paired with the 1-field delay signal S2 is the current field signal S1 or 2-field delay signal S3. As will be described later, the inter-frame correlation result from the inter-frame correlation determination circuit 36 is used in the pull-down signal determination circuit 39 as a condition for transition from the pull-down signal determination state to the non-pull-down signal determination state.

Figures 7A, 7B:
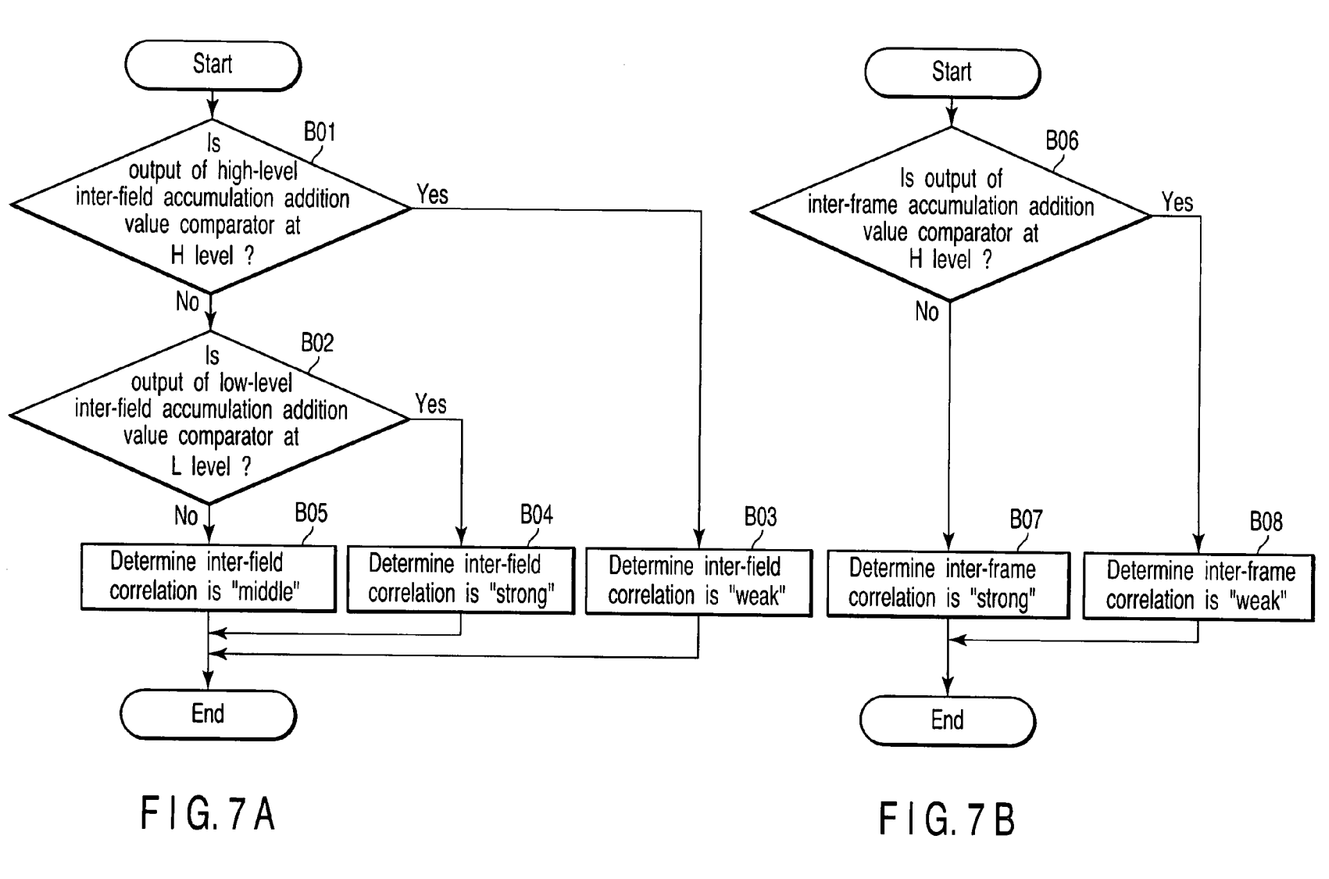
FIGS. 7A and 7B show embodiments of determination methods of an inter-field correlation determination circuit 32 and an inter-frame correlation determination circuit 36.

Next, referring to FIGS. 7A and 7B, a description is given of a first embodiment of determination methods of the inter-field correlation determination circuit 32 and inter-frame correlation determination circuit 36. FIG. 7A is a flow chart illustrating the determination method of the inter-field correlation determination circuit 32, and FIG. 7B is a flow chart illustrating the determination method of the inter-frame correlation determination circuit 36.

In block 01 in FIG. 7A, if the input signal from the high-level inter-field accumulation addition value comparator 30 is at an H level (i.e. if the output signal value from the accumulation adder 28 is greater than the comparison level Bhc), the inter-field correlation determination circuit 32 determines that the inter-field correlation is "weak" (block 03). If the input signal from the high-level inter-field accumulation addition value comparator 30 is at an L level (No in block 01) and the input signal from the low-level inter-field accumulation addition value comparator 31 is at an L level (i.e. if the output signal value from the accumulation adder 29 is less than the comparison level Blc), the inter-field correlation determination circuit 32 determines that the inter-field correlation is "strong" (block 04). In other cases, the inter-field correlation determination circuit 32 determines that the inter-field correlation is "middle" (block 05).

In the pull-down signal, with respect to the scene with many vertical high-frequency components as shown in FIG. 5, the inter-field correlation is "strong" or "middle", as shown in part (h) of FIG. 5, between the paired fields (an odd field and an even field; for example, Bo and Be in FIG. 5). If there is motion between different fields, the inter-field correlation is "weak".

On the other hand, in the pull-down signal shown in FIG. 6, with respect to the scene with few vertical high-frequency components, the inter-field correlation is "strong", as shown in part (h) of FIG. 6, between the paired fields. If there is motion between different fields, the inter-field correlation is "middle" or "weak".

As regards the inter-frame correlation of the inter-frame correlation determination circuit 36 shown in FIG. 7B, if the output signal from the inter-frame accumulation addition value comparator 35 is at an H level in block 06 (i.e. if the output signal level from the accumulation adder 34 is greater than the comparison level Bfc), the inter-frame correlation determination circuit 36 determines that the inter-frame correlation is "weak" (block 08). Otherwise, the inter-frame correlation determination circuit 36 determines that the inter-frame correlation is "strong" (block 07).

Figure 8:
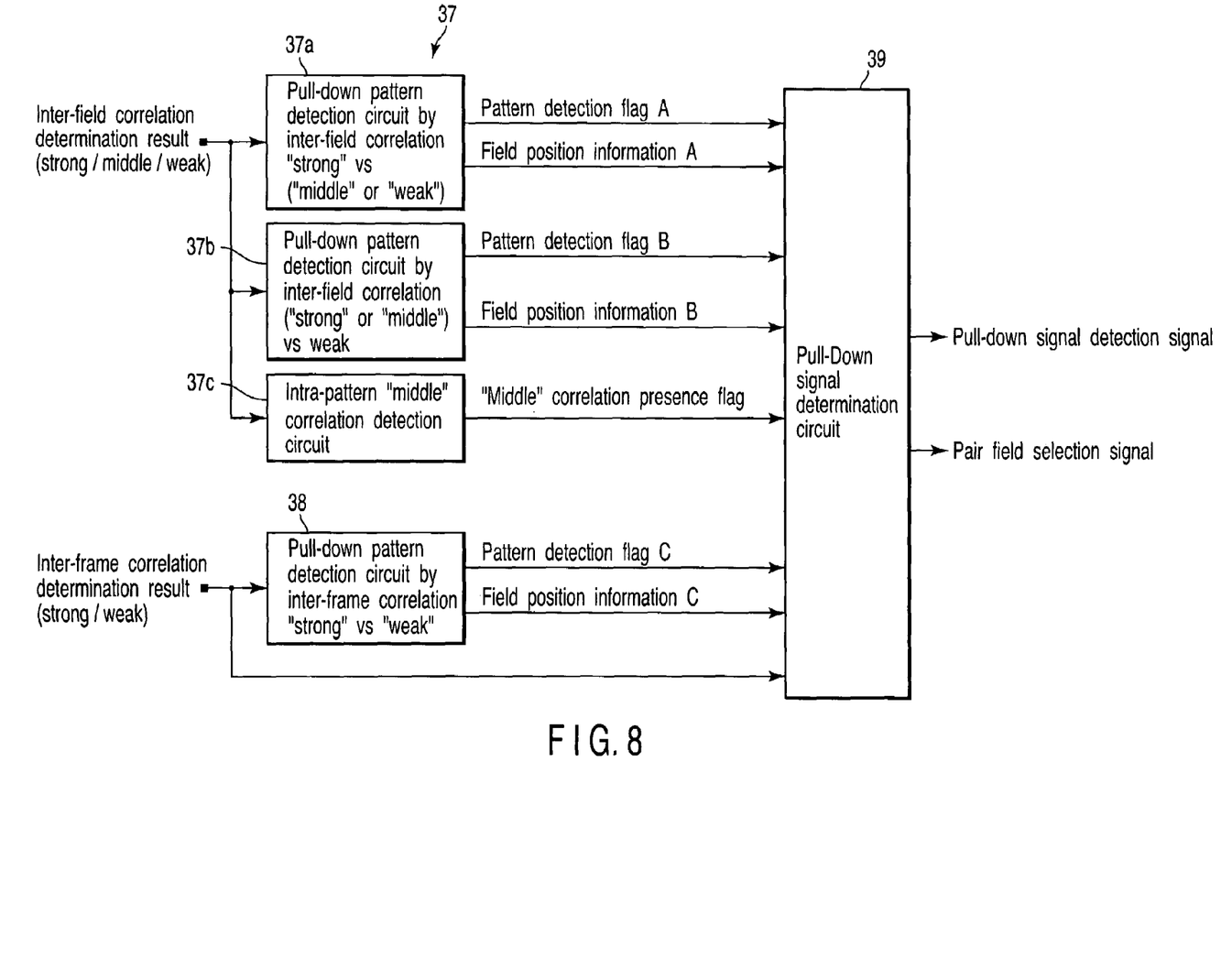
FIG. 8 shows a first embodiment of pull-down pattern detection circuits 37 and 38.

Next, referring to FIG. 8, a description is given of a first embodiment of the pull-down pattern detection circuits 37 and 38 of the present invention. A determination result "strong/middle/weak" of the inter-field correlation determination circuit 32 is input to a first pull-down pattern detection circuit 37a, a second pull-down pattern detection circuit 37b and an intra-pattern "middle" correlation detection circuit 37c.

The first pull-down pattern detection circuit 37a detects a pull-down pattern by determining the correlation between the paired fields of the pull-down signal and the correlation between still-image fields to be "strong" correlation. In addition, the first pull-down pattern detection circuit 37a detects a pull-down pattern by determining the correlation between motion-picture fields, other than the paired fields of the pull-down signal, and the correlation between motion-picture fields of a non-pull-down signal to be "middle" correction or "weak" correlation.

For example, during a time period P1 in part (h) of FIG. 6, in the case of a 2-3 pull-down signal, the determination result of the inter-field correlation determination circuit 32 with respect to plural fields is a repetition of a pull-down pattern of ("strong", "middle or weak", "strong", "strong", "middle or weak"). The first pull-down pattern detection circuit 37a detects this pull-down pattern and outputs 3-bit data of a pattern detection flag A and field position information A which indicates a position in the pattern (i.e. a field position in the five fields). In the case of a 2-2 pull-down signal, the determination result of the inter-field correlation determination circuit 32 with respect to plural fields is a repetition of a pull-down pattern of ("strong", "middle or weak"). Thus, the first pull-down pattern detection circuit 37a detects this pull-down pattern. The first pull-down pattern detection circuit 37a can mainly detect a pattern of a pull-down signal with few vertical high-frequency components.

On the other hand, the second pull-down pattern detection circuit 37b detects a pull-down pattern by determining the correlation between the paired fields of the pull-down signal and the correlation between still-image fields to be "strong" correlation or "middle" correlation. In addition, the second pull-down pattern detection circuit 37b detects a pull-down pattern by determining the correlation between motion-picture fields, other than the paired fields of the pull-down signal, and the correlation between motion-picture fields of a non-pull-down signal to be "weak" correlation.

For example, during a time period P2 in part (h) of FIG. 5, in the case of a 2-3 pull-down signal, the determination result of the inter-field correlation determination circuit 32 with respect to plural fields is a repetition of a pull-down pattern of ("strong or middle", "weak", "strong or middle", "strong or middle", "weak"). The second pull-down pattern detection circuit 37b detects this pull-down pattern and outputs 3-bit data of a pattern detection flag B and field position information B which indicates a position in the pattern. In the case of a 2-2 pull-down signal, the determination result of the inter-field correlation (strong/middle/weak) with respect to plural fields is a repetition of a pull-down pattern of ("strong or middle", "weak"). Thus, the second pull-down pattern detection circuit 37b detects this pull-down pattern. The second pull-down pattern detection circuit 37b can mainly detect a pattern of a pull-down signal with many vertical high-frequency components.

The intra-pattern "middle" detection circuit 37c outputs a "middle" correlation presence flag which indicates whether a "middle" correlation is detected in the pattern or not. This flag is used in the pull-down signal determination circuit 39 in order to execute a control to determine whether the pull-down pattern detection result by the inter-frame correlation is to be used for the pull-down signal determination, when the pull-down pattern is detected in the first and/or second pull-down pattern detection circuit 37a, 37b.

The determination result (strong/weak) of the inter-frame correlation determination circuit 36 is input to the third pull-down pattern detection circuit 38. The third pull-down pattern detection circuit 38 detects a pull-down pattern by determining the correlation between the same repetitive fields of the pull-down signal (e.g. two "Be" at time t1 in FIG. 5, two "De" at time t2, and two "Fe" at time t3) and the correlation between still-image fields to be "strong" correlation. In addition, the third pull-down pattern detection circuit 38 detects a pull-down pattern by determining the correlation between motion-picture fields, other than the same repetitive fields of the pull-down signal, and the correlation between motion-picture fields of a non-pull-down signal to be "weak" correlation.

For example, during a time period P3 in part (d) of FIG. 5, in the case of a 2-3 pull-down signal, the determination result of the inter-frame correlation determination circuit 36 with respect to plural fields is a repetition of a pattern of ("weak", "weak", strong", "weak", "weak"). The third pull-down pattern detection circuit 38 detects this pattern and outputs 3-bit data of a pattern detection flag C and field position information C which indicates a position in the pattern. In the case of a 2-2 pull-down signal, the determination result of the inter-frame correlation determination circuit 36 with respect to plural fields is a pattern of (always "weak"). Thus, the third pull-down pattern detection circuit 38 detects this pattern. Since the inter-frame correlation result is not affected by vertical high-frequency components of the input video signal, the detection result of the third pull-down pattern detection circuit 38 is not affected by "many/few" vertical high-frequency components. However, in order to detect a 2-2 pull-down signal, the inter-field correlation result needs to be used since it is not possible to distinguish the 2-2 pull-down signal from a motion-picture scene of a non-pull-down signal on the basis of the inter-frame correlation result alone.

Figure 9:
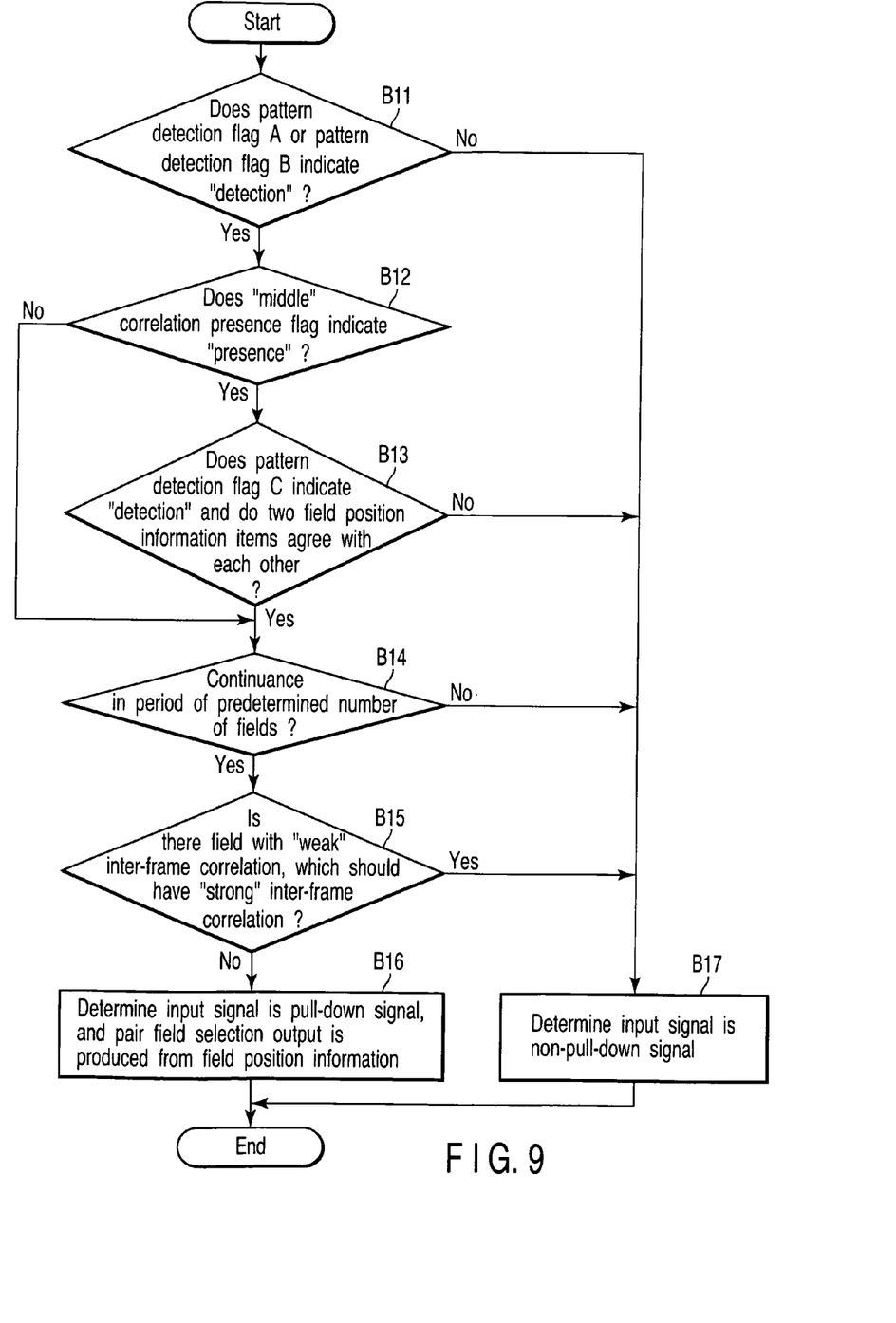
FIG. 9 is a flow chart illustrating the operation of an embodiment of a pull-down signal determination circuit 39.

Next, referring to a flow chart of FIG. 9, an embodiment of the pull-down signal determination circuit 39 according to the invention is described.

In block 11, the pull-down signal determination circuit 39 executes first determination to determine whether the signal input to the apparatus is a pull-down signal or not, using the pattern detection results based on inter-field correlation from the pull-down pattern detection circuits 37a and 37b, that is, the pattern detection flags A and B.

In block 12, if the "middle" correlation detection circuit 37c indicates the presence of "middle" correlation (Yes in block 12), the pull-down signal determination circuit 39 executes second determination in block 13 to determine whether the pattern detection result based on inter-frame correlation from the pull-down pattern detection circuit 38, that is, the pattern detection flag C, indicates "detection". If the pattern detection flag C indicates "detection", the pull-down signal determination circuit 39 further determines whether the field phases of the pattern detected by the inter-field correlation and the pattern detected by the inter-frame correlation agree with each other, using the field position information A, B and C. Specifically, when the flag C indicates "detection", the pull-down signal determination circuit 39 determines whether the field phase of the field position information of the pull-down detection circuit 37a or 37b, which outputs the flag (i.e. indicates "detection"), agrees with the field phase of the field position information C which is output from the pull-down pattern detection circuit 38. For example, when the "middle" correlation presence flag indicates "presence" and the pull-down pattern detection circuit 37a detects the pull-down pattern and outputs the pattern detection flag A of H level, the pull-down signal determination circuit 39 determines whether the field position information A is the same value as the field position information C. Thus, the reliability of the pull-down signal determination is enhanced.

In a subsequent block 14, it is determined whether the pull-down pattern is continuously detected during a period of a predetermined number of fields. With the addition of this determination condition, it becomes possible to stabilize the pull-down signal determination. In addition, the inter-frame correlation result (correlation of signals S1 and S3) of the same repetitive fields of the pull-down signal becomes "strong" correlation with high reliability. Thus, if the inter-frame correlation result at the position of the same repetitive fields on the pull-down pattern is "weak" correlation in block 15 (Yes in block 15), erroneous detection is determined and the input signal is determined to be a non-pull-down signal.

Figure 10:
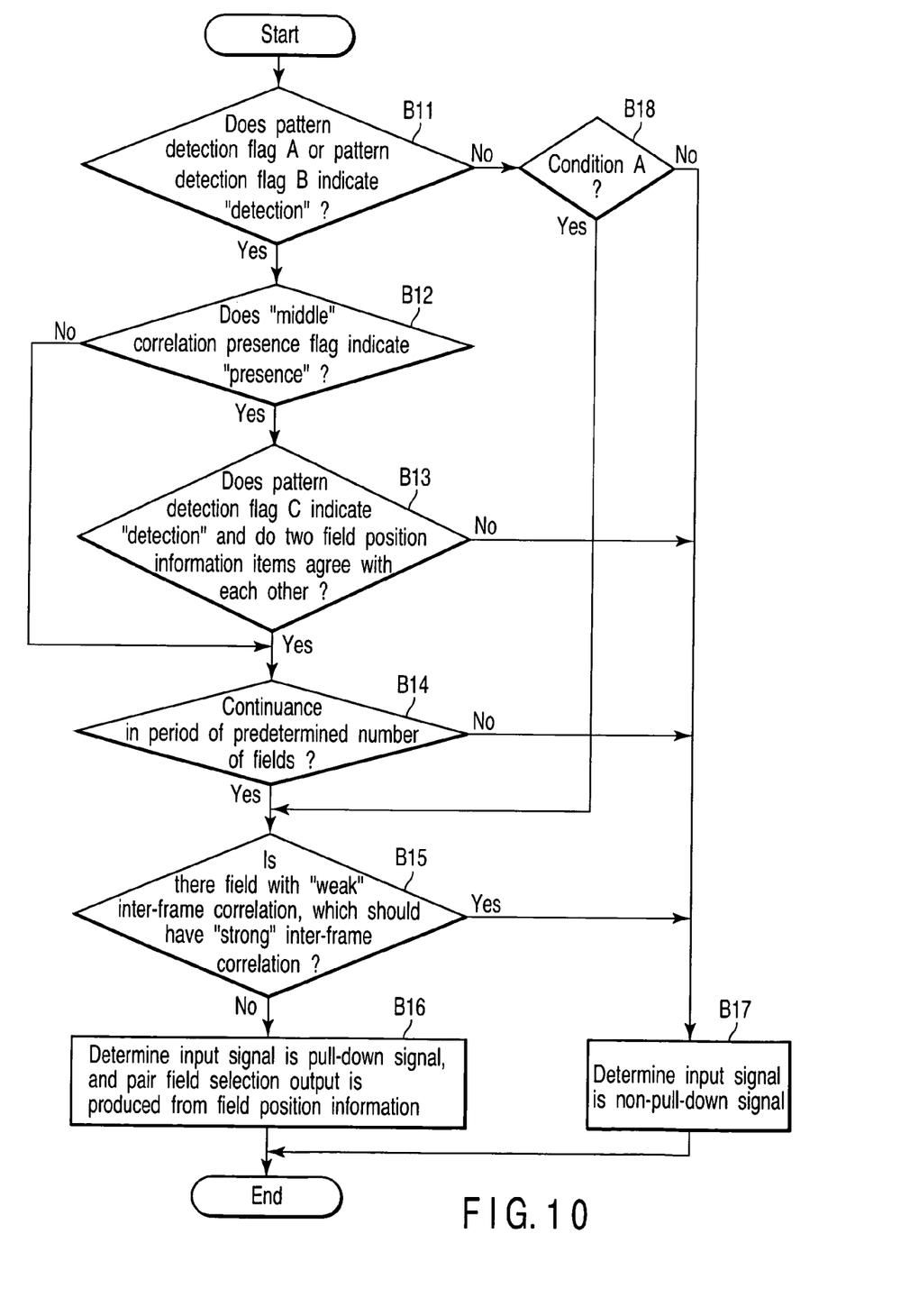
FIG. 10 is a flow chart illustrating the operation of another embodiment of the pull-down signal determination circuit 39.

Next, referring to a flow chart of FIG. 10, another embodiment of the pull-down signal determination circuit 39 of the invention is described. The difference from the operation illustrated in FIG. 9 is explained.

In block 18, if the following condition (1) or (2) is satisfied, the process goes to block 15.

Condition (1): A pull-down signal is determined by a first pattern in the previous field, and a field, which should have a "middle" or "weak" correlation level, has a "strong" level on the detected first pattern.

Condition (2): A pull-down signal is determined by a second pattern in the previous field, and a field, which should have a "weak" level, has a "strong" or "middle" level on the detected second pattern.

Thereby, if a still-image scene is included in the pull-down signal, a non-pull-down signal is not determined and the pull-down signal is continuously determined.

If the input video signal is determined to be a pull-down signal in the process flow as described above, the pull-down signal determination circuit 39 outputs a pull-down signal detection signal with a value indicative of "detection", and generates a pair field selection signal on the basis of the field position information and outputs the pair field selection signal. As shown in FIG. 1, the pull-down signal detection signal is delivered to the selector 19, and the pair field selection signal is delivered to the selector 18. The subsequent operation is as described above.

As has been described above, according to the pull-down signal detection apparatus, pull-down signal detection method, progressive-scan conversion apparatus and progressive-scan conversion method relating to the embodiments of the present invention, the pull-down signal can satisfactorily be detected, regardless of whether there are many/few vertical high-frequency components in the pull-down signal, and a progressive-scan conversion output with a higher image quality can be obtained.

The above description is directed to embodiments of the invention, and does not restrict the apparatus and method of the present invention. Various modification can easily be made. The present invention covers apparatuses or methods which are constituted by properly combining the structural elements, functions, features or process steps in the embodiments.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A pull-down signal detection apparatus comprising:
a first difference circuit which provides a first difference between a current field signal of an input video signal and a 1-field delay signal of the current field signal;
a first inter-field comparison unit configured to compare the first difference from the first difference circuit with a first comparison value, add comparison results on a field-by-field basis, compare an addition value of the added comparison results with a second comparison value on a field-by-field basis, and provide a first inter-field comparison result;
a second inter-field comparison unit configured to compare the first difference from the first difference circuit with a third comparison value that is less than the first comparison value, add comparison results on a field-by-field basis, compare an addition value of the added comparison results with a fourth comparison value on a field-by-field basis, and provide a second inter-field comparison result;
an inter-field correlation determination circuit which determines an inter-field correlation on the basis of the first inter-field comparison result and the second inter-field comparison result, and provides a determination result which indicates one of "strong", "middle" and "weak" levels;
a second difference circuit which provides a second difference between the current field signal of the input video signal and a 2-field delay signal of the current field signal;
an inter-frame correlation determination circuit which determines an inter-frame correlation on the basis of the second difference from the second difference circuit, and provides a determination result; and
a pull-down signal determination circuit which determines whether the input video signal is a pull-down signal or not, on the basis of the determination results of the inter-field correlation determination circuit and the inter-frame correlation determination circuit.

2. The pull-down signal detection apparatus according to claim 1, wherein the inter-field correlation determination circuit determines that the inter-field correlation is a weak level in a case where the first inter-field comparison result is greater than the second comparison value, determines that the inter-field correlation is a strong level in a case where the second inter-field comparison result is less than the fourth comparison value, and determines that the inter-field correlation is a middle level in other cases.

3. The pull-down signal detection apparatus according to claim 1, wherein the pull-down signal determination circuit includes a first pattern detection circuit which detects a first pattern of a strong-level determination result of the inter-field correlation determination circuit and a middle-level or weak-level determination result of the inter-field correlation determination circuit with respect to a plurality of fields, a second pattern detection circuit which detects a second pattern of a strong-level or middle-level determination result of the inter-field correlation determination circuit and a weak-level determination result of the inter-field correlation determination circuit with respect to a plurality of fields, and a third pattern detection circuit which detects a predetermined pattern with respect to a plurality of fields of the pull-down signal on the basis of the determination result of the inter-frame correlation determination circuit, and
the input video signal is determined to be the pull-down signal when at least one of the first and second pattern detection circuits indicates pattern detection.

4. The pull-down signal detection apparatus according to claim 3, wherein the pull-down signal determination circuit determines that the input video signal is a non-pull-down signal when a field, which should have a strong-level correlation, has a weak-level correlation on the detected third pattern.

5. The pull-down signal detection apparatus according to claim 3, wherein the pull-down signal determination circuit continues determination that the input video signal is the pull-down signal when the pull-down signal is determined by the first pattern in the previous field, a field, which should have a middle-level or weak-level correlation, has a strong-level correlation on the detected first pattern, and a field, which should have a strong-level correlation, does not have a weak-level correlation on the detected third pattern.

6. The pull-down signal detection apparatus according to claim 3, the pull-down signal determination circuit continues determination that the input video signal is the pull-down signal when the pull-down signal is determined by the second pattern in the previous field, a field, which should have a weak-level correlation, has a strong-level or middle-level correlation on the detected second pattern, and a field, which should have a strong-level correlation, does not have a weak-level correlation on the detected third pattern.

7. The pull-down signal detection apparatus according to claim 1, wherein the pull-down signal determination circuit includes a first pattern detection circuit which detects a first pattern with respect to a plurality of fields of the pull-down signal on the basis of the determination results of the inter-field correlation determination circuit, a second pattern detection circuit which detects a second pattern with respect to a plurality of fields of the pull-down signal on the basis of the determination results of the inter-field correlation determination circuit, a middle-level correlation detection circuit which detects a middle-level correlation in the determination results, and a third pattern detection circuit which detects a predetermined pattern with respect to a plurality of fields of the pull-down signal on the basis of the determination results of the inter-frame correlation determination circuit, and the input video signal is determined to be the pull-down signal when at least of the first and second pattern detection circuits indicates pattern detection, the middle-level correlation detection circuit detects the middle-level correlation and the detected pattern agrees with the predetermined pattern of the third pattern detection circuit, and the input video signal is determined to be the pull-down signal, regardless of a detection result of the third pattern detection circuit, when at least of the first and second pattern detection circuits indicates pattern detection and the middle-level correlation detection circuit does not detect the middle-level correlation.

8. A pull-down signal detection method comprising:

providing a first difference between a current field signal of an input video signal and a 1-field delay signal of the current field signal;

comparing the first difference with a first comparison value, adding comparison results on a field-by-field basis, comparing an addition value of the added comparison result with a second comparison value on a field-by-field basis, and providing a first inter-field comparison result;

comparing the first difference with a third comparison value that is less than the first comparison value, adding comparison results on a field-by-field basis, comparing an addition value of the added comparison result with a fourth comparison value on a field-by-field basis, and providing a second inter-field comparison result;

determining an inter-field correlation on the basis of the first inter-field comparison result and the second inter-field comparison result, and providing a determination result which indicates one of "strong", "middle" and "weak" levels;

providing a second difference between the current field signal of the input video signal and a 2-field delay signal of the current field signal;

determining an inter-frame correlation on the basis of the second difference, and providing a determination result; and determining whether the input video signal is a pull-down signal or not, on the basis of the determination results of the inter-field correlation and the inter-frame correlation.

9. The pull-down signal detection method according to claim 8, wherein the determining the inter-field correlation includes determining that the inter-field correlation is a weak level in a case where the first inter-field comparison result is greater than the second comparison value, and determining that the inter-field correlation is a middle/strong level in a case where the second inter-field comparison result is less than the fourth comparison value.

10. The pull-down signal detection method according to claim 8, wherein the determining the pull-down signal includes: detecting a first pattern of a strong-level determination result of the determining the inter-field correlation and a middle-level or weak-level determination result of the determining the inter-field correlation with respect to a plurality of fields; detecting a second pattern of a strong-level or middle-level determination result of the determining the inter-field correlation and a weak-level determination result of the determining the inter-field correlation with respect to a plurality of fields; and detecting a predetermined pattern with respect to a plurality of fields of the pull-down signal on the basis of the determination result of the determining the inter-frame correlation, and the method further comprises determining the input video signal to be the pull-down signal when at least one of the first pattern and the second pattern is detected.

11. The pull-down signal detection method according to claim 10, wherein the determining the pull-down signal includes determining that the input video signal is a non-pull-down signal when a field, which should have a strong-level correlation, has a weak-level correlation on the detected third pattern.

12. The pull-down signal detection method according to claim 10, wherein the determining the pull-down signal continues determination that the input video signal is the pull-down signal when the pull-down signal is determined by the first pattern in the previous field, a field, which should have a middle-level or weak-level correlation, has a strong-level correlation on the detected first pattern, and a field, which should have a strong-level correlation, does not have a weak-level correlation on the detected third pattern.

13. The pull-down signal detection method according to claim 10, wherein the determining the pull-down signal continues determination that the input video signal is the pull-down signal when the pull-down signal is determined by the second pattern in the previous field, a field, which should have a weak-level correlation, has a strong-level or middle-level correlation on the detected second pattern, and a field, which should have a strong-level correlation, does not have a weak-level correlation on the detected third pattern.

14. The pull-down signal detection method according to claim 8, wherein the determining the pull-down signal includes: a first pattern detection of detecting a first pattern with respect to a plurality of fields of the pull-down signal on the basis of the determination result of the determining the inter-field correlation; a second pattern detection of detecting a second pattern with respect to a plurality of fields of the pull-down signal on the basis of the determination result of the determining the inter-field correlation; a middle-level correlation detection of detecting a middle-level correlation in the determination result; and a third pattern detection of detecting a predetermined pattern with respect to a plurality of fields of the pull-down signal on the basis of the determination result of the determining the inter-frame correlation, and the input video signal is determined to be the pull-down signal when at least of the first and second pattern detection indicates pattern detection, the middle-level correlation detection detects the middle-level correlation and the detected pattern agrees with the predetermined pattern of the third pattern detection, and the input video signal is determined to be the pull-down signal.

15. A progressive-scan conversion apparatus comprising:

a field delay circuit which provides a 1-field delay signal that is obtained by delaying a current field signal of an input video signal by one field period, and a 2-field delay signal that is obtained by further delaying the 1-field delay signal by one field period;

an interpolation signal generating circuit which generates a first interpolation signal from at least one of the current field signal, the 1-field delay signal and the 2-field delay signal;

a pull-down signal detection circuit which detects a pull-down signal from the current field signal, the 1-field delay signal and the 2-field delay signal;

a first selector which selects one of the current field signal and the 2-field delay signal on the basis of a detection result of the pull-down signal detection circuit, and provides the selected signal as a pair field signal;

a second selector which selects one of the first interpolation signal and the pair field signal on the basis of the detection result of the pull-down signal detection circuit, and provides the selected signal as a second interpolation signal; and a progressive-scan conversion circuit which mixes the 1-field delay signal and the second interpolation signal and provides a progressive-scan conversion signal, wherein the pull-down signal detection circuit comprises:

an inter-field correlation determination unit configured to determine an inter-field correlation on the basis of the current field signal and the 1-field delay signal, and providing a determination result which indicates one of "strong", "middle" and "weak" levels;

an inter-frame correlation determination unit configured to determine an inter-frame correlation on the basis of the current field signal and the 2-field delay signal; and a pull-down signal determination unit configured to determine whether the input video signal is a pull-down signal or not, on the basis of the determination results of the inter-field correlation determination unit and the inter-frame correlation determination unit.

16. The progressive-scan conversion apparatus according to claim 15, wherein the pull-down signal detection circuit comprises:

a first difference circuit which provides a first difference between the current field signal and the 1-field delay signal;

a first inter-field comparison unit configured to compare the first difference from the first difference circuit with a first comparison value, add a comparison results on a field-by-field basis, compare an addition value of the added comparison results with a second comparison value on a field-by-field basis, and provide a first inter-field comparison result;

a second inter-field comparison unit configured to compare the first difference from the first difference circuit with a third comparison value that is less than the first comparison value, add a comparison results on a field-by-field basis, compare an addition value of the added comparison results with a fourth comparison value on a field-by-field basis, and provide a second inter-field comparison result;

an inter-field correlation determination circuit which determines an inter-field correlation on the basis of the first inter-field comparison result and the second inter-field comparison result, and provides a determination result which indicates one of "strong", "middle" and "weak" levels;

a second difference circuit which provides a second difference between the current field signal of the input video signal and a 2-field delay signal of the current field signal;

an inter-frame correlation determination circuit which determines an inter-frame correlation on the basis of the second difference from the second difference circuit, and provides a determination result; and a pull-down signal determination circuit which determines whether the input video signal is a pull-down signal or not, on the basis of the determination results of the inter-field correlation determination circuit and the inter-frame correlation determination circuit.

17. The progressive-scan conversion apparatus according to claim 16, wherein the inter-field correlation determination circuit determines that the inter-field correlation is a weak level in a case where the first inter-field comparison result is greater than the second comparison value, determines that the inter-field correlation is a strong level in a case where the second inter-field comparison result is less than the fourth comparison value, and determines that the inter-field correlation is a middle level in other cases.

18. The progressive-scan conversion apparatus according to claim 16, wherein the pull-down signal determination circuit includes a first pattern detection circuit which detects a first pattern of a strong-level determination result of the inter-field correlation determination circuit and a middle-level or weak-level determination result of the inter-field correlation determination circuit with respect to a plurality of fields, a second pattern detection circuit which detects a second pattern of a strong-level or middle-level determination result of the inter-field correlation determination circuit and a weak-level determination result of the inter-field correlation determination circuit with respect to a plurality of fields, and a third pattern detection circuit which detects a predetermined pattern with respect to a plurality of fields of the pull-down signal on the basis of the determination result of the inter-frame correlation determination circuit, and the input video signal is determined to be the pull-down signal when at least one of the first and second pattern detection circuits indicates pattern detection.

* * * * *

UNITED STATES PATENT AND TRADEMARK OFFICE
CERTIFICATE OF CORRECTION

| | | |
|---|---|---|
| PATENT NO. | : 7,705,914 B2 | Page 1 of 1 |
| APPLICATION NO. | : 11/443026 | |
| DATED | : April 27, 2010 | |
| INVENTOR(S) | : Yamauchi | |

It is certified that error appears in the above-identified patent and that said Letters Patent is hereby corrected as shown below:

Claim 7, column 13, line 2, change "at least of" to --at least one of--.

Claim 7, column 13, line 9, change "at least of" to --at least one of--.

Claim 14, column 14, line 44, change "at least of" to --at least one of--.

Claim 16, column 15, line 31, change "add a comparison" to --add comparison--.

Claim 16, column 15, line 39, change "add a comparison" to --add comparison--.

Signed and Sealed this
Twentieth Day of March, 2012

David J. Kappos
*Director of the United States Patent and Trademark Office*